Feb. 13, 1934.   O. WITTEL   1,946,604
FILM WINDING DEVICE FOR MOTION PICTURE APPARATUS
Filed May 9, 1929   2 Sheets-Sheet 1
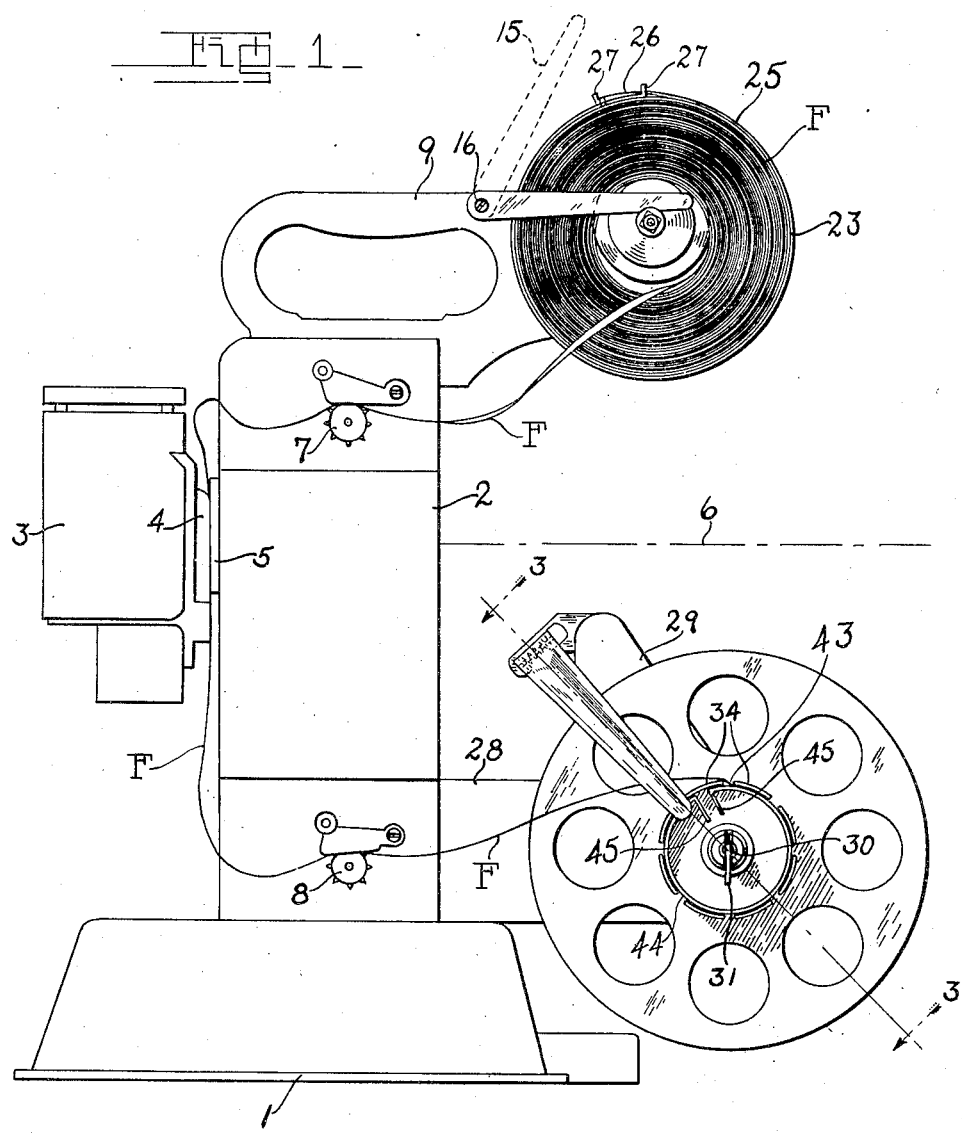
Inventor
Otto Wittel
By Newton M. Perrins
Donald H. Stewart
Attorneys Feb. 13, 1934.   O. WITTEL   1,946,604
FILM WINDING DEVICE FOR MOTION PICTURE APPARATUS
Filed May 9, 1929   2 Sheets-Sheet 2
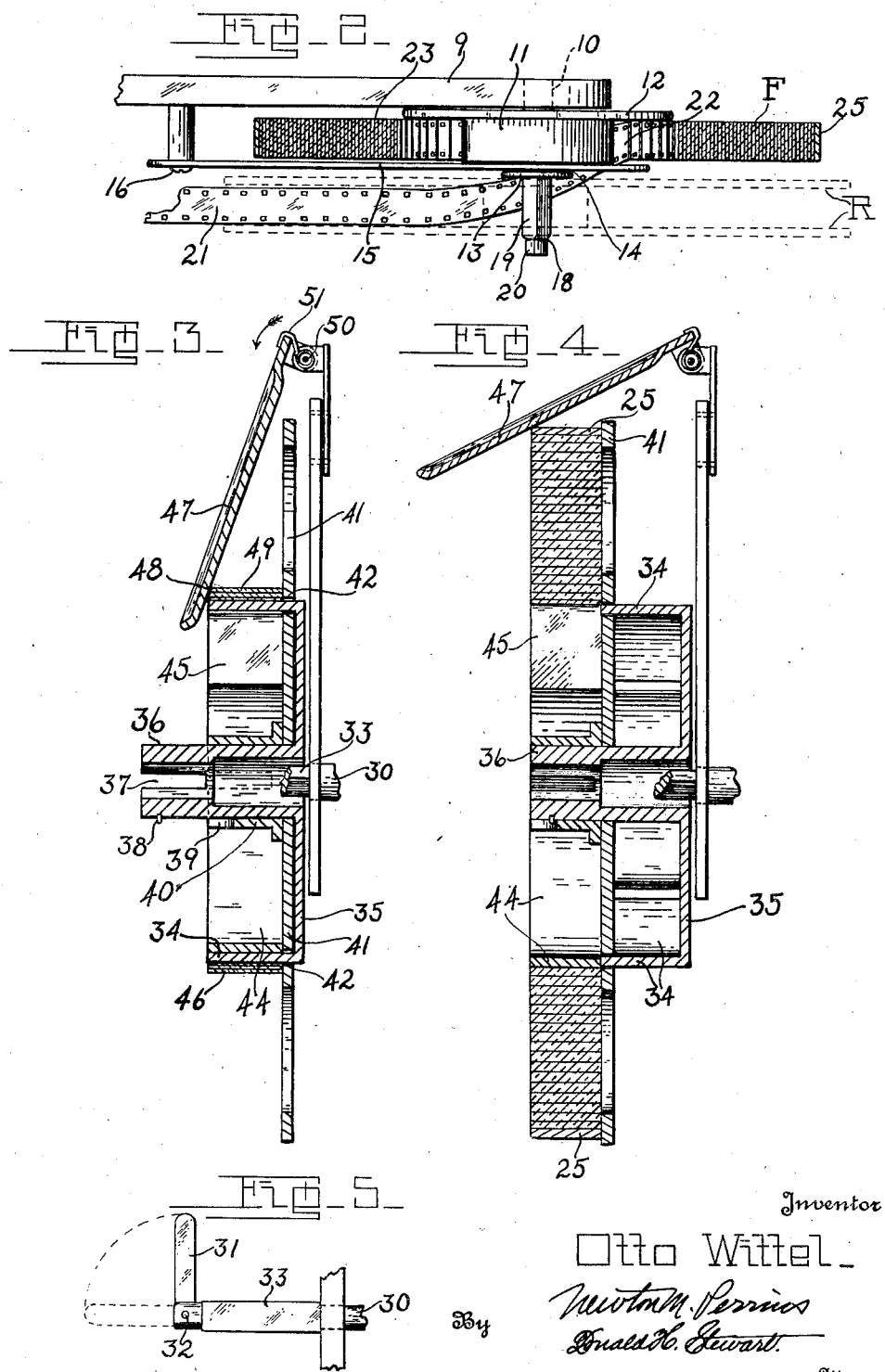

Patented Feb. 13, 1934

1,946,604

UNITED STATES PATENT OFFICE 1,946,604

FILM WINDING DEVICE FOR MOTION PICTURE APPARATUS

Otto Wittel, Rochester, N. Y., assignor to Eastman Kodak Company, Rochester, N. Y., a corporation of New York Application May 9, 1929. Serial No. 361,692

5 Claims. (Cl. 242—55)

This invention relates to photography and more particularly to motion picture projectors. One object of my invention is to provide a motion picture projector with equipment which permits film to be passed through the projector a number of times without rewinding the film on the supply reel as is customary. Another object of my invention is to provide a film supporting structure which may be turned by the film and which will support the film in the desired position. Another object of my invention is to provide a projector with a support for film supplying reels on which a coil of film and a spool of film may be mounted either alternately or at the same time. Another object of my invention is to provide a film support for a coil of film in which the coil of film is located to one side of the normal film path, the film being drawn from the coil to the normal path from an inside convolution. Another object of my invention is to provide a motion picture projector with a pair of axially arranged supports, one for a coil of film located to one side of the normal film path and the other for a film reel located in the normal film path, the film moving mechanism being adapted to draw film through the normal film path from either the film coil or the film reel. Another object of my invention is to provide hinged film guiding members which will retain the film in the proper position. Still another object of my invention is to provide a hinged film guiding member arranged to contact with each outer convolution of film as it is wound on a hub, and other objects will appear from the following specification, the novel feature being particularly pointed out in the claims at the end thereof.

Coming now to the drawings wherein like reference characters denote like parts throughout:

Figure 1 is a side elevation of a motion picture projector equipped with film supports constructed in accordance with and embodying a preferred form of my invention;

Figure 2 is a fragmentary top plan view partially in section of the upper film holding supports;

Figure 3 is a sectional view on line 3—3 of the lower film holding support showing a film guide in its starting position;

Figure 4 is a sectional view similar to Figure 3 but with the parts in a different position; and Figure 5 is a fragmentary detail of the lower power driven shaft by which the hub member may be driven.

A motion picture projector constructed in accordance with my invention may be used with the usual type of film reels or with a special type of non-rewind apparatus which will be hereinafter more fully described. As this projector is particularly suitable for educational purposes it is provided with an upper or supply reel structure which permits placing several coils of film on the machine at one time if this should be desirable.

In Figure 1 of the drawings a well known type of projector is diagrammatically illustrated as comprising a base 1 supporting an upright body portion 2 in which an objective and shutter are located.

A lamp house 3 is located behind a film gate comprising relatively movable plates 4 and 5 and the pictures are projected from the machine along the dot and dash line 6 when the film moving mechanism is in operation.

The film moving mechanism may be of any well known type such as a claw or Geneva movement for moving the film intermittently through the film gate. The film F here being shown as being advanced to the gate by means of a power driven sprocket 7 and being moved from the gate by means of a second power driven sprocket 8.

The film supporting structure of the projector is here shown as consisting of an upper bracket 9 which supports the supply reels. As best shown in Figure 2 the upper bracket 9 revolubly supports a shaft 10 on which there is mounted a flanged roller 11. If desired a rewinding mechanism as shown in Patent No. 1,658,361, J. Tessier, Feb. 8, 1928 may be used to turn shaft 10; but this forms no part of the present invention and consequently is not illustrated. The roller 11 may turn freely on or may turn with shaft 10.

The roller 11 is provided with one flange 12 which is of greater diameter than the diameter of the roller 11 and with a second flange 13 which is of smaller diameter than the roller 11. The second or smaller flange is grooved at 14 to provide a seat for a film guiding arm 15 mounted on a stud 16 carried by the bracket 9.

As will appear from Figure 1, arm 15 may be swung upon its stud 16 so that the coil of film F may be placed on or may be removed from the roller 11. Arm 15 has the additional function of separating a coil of film F mounted on a roller 11 from a film reel R which may be mounted on the shaft 18 which is arranged axially with or which may be a part of the shaft 10.

The shaft designated broadly as 18 may be provided with a square portion 19 and a round portion 20, the square portion 19 being adapted to fit in and to drive a squared aperture in a film reel R in a well known manner.

It should be noticed that the film roller 11 is located to one side of the normal film path which is indicated by the position of the film in Figure 2 at 21. From this position the film passes over the sprockets 7 and 8 and through the pull-down mechanism of the projector. Since the film is drawn from the inner convolution 22 of the coil 23 it is drawn about the roller 11 in such a manner that as sprocket 7 withdraws the film from the coil the roller 11 is rotated. Thus there is very little, if any, friction between the inner convolution 22 and the surface of the roller 11 while the film is in movement.

The surface of the roller 11 may, if desired, be faced with a soft material such as felt, leather, rubber or the like but I do not find this is necessary in practice.

As shown in Figure 1 the outside of the film coil 23 is held in position by means of a strip or band 25 which is provided with over-lapping ends 26 which may be adjusted by means of the handles 27. The construction of this strip forms the subject matter of a separate application and will not be herein further described.

After the film leaves the supply station it passes through the film gate 4—5 being propelled to and from this gate by the power driven sprockets 7 and 8 the film is wound up upon a hub member which is supported by means of a lower bracket 28 which carries a projection 29 and a power driven shaft 30 in the end of which a latch 31 is hingedly mounted on a pintle 32 as best shown in Figure 5. This shaft is here shown as being provided with a square portion 33 which may drive the usual type of film reel R if desired.

When the non-rewind feature is used and a coil of film F forms the film supply, the film being drawn from the roller 11, I prefer to use a special type of wind-up which is shown in my copending application Serial No. 361,693 filed May 9, 1929, which issued as Patent No. 1,823,245, dated Sept. 15, 1931.

This hub member consists of a series of arms which, as best shown in Figures 3 and 4, project from one side of a base plate 35. The base plate is provided with a central hub member 36 having a slot 37 in one end and having a pin 38 adapted to slide in a slot 39 in a sleeve 40 which is slidable upon the outside of the hub 36.

Sleeve 40 can slide only a limited distance on the hub due to the pin 38 and slot 39 and due to the base plate 35.

The sleeve 40 carries a flange 41 which has a plurality of slots 42 through which the hub members 34 may slide. When film is to be wound upon the hub members 34 the parts may be arranged in the position shown in Figure 3 in which the slot 37 may be engaged by the latch 31 (Figure 5) so that there is driving engagement between the power driven shaft 30 and the hub.

With the parts in this position one end of the film F may be placed through an opening 43 lying between two of the hub members 34, as best shown in Figure 1. If the film coil is to be stored up after it is wound on the hub a spring member 44 having turned down finger grips 45 may be placed in the position shown in Figure 1 in which case the end of the film will be pressed against the inside of a hub member 34.

With the parts in the position shown in Figure 3 the projection machine is started and a series of film coils 46 are wound on the hub, being held flat against the flange member 41 by means of a film guiding arm 47. This arm is curved in cross section so that it has substantially point contact at 48 with the outer convolutions 49 of film as it is wound upon the hub, and since member 47 is hingedly mounted at 50 and is provided with a coil spring 51 which tends to turn the arm in the direction shown by the arrow it presses the film firmly in position against the flange.

When the winding operation is completed and all of the film is upon the hub the film coil may be removed from the members 34 by simply pressing the flange 41 outwardly with respect to the core 36. This, as shown in Figure 4, will thrust the arm 47 upwardly and will move the film from the hub member 34 to the spring hub member 44 so that the inner convolution of film will be supported by means of 44.

It is the best practice to place the strap 25 around the outside of the film coil before removing it from its wind-up position. This can readily be done by manipulating the handles 27 and after sliding the strap about the film coil the handles may be pushed apart to tighten the strap.

The film coil thus removed can be readily handled without danger of one end becoming loose.

The coil of film removed from the take-up mechanism can be applied to the supply roller 11 without rewinding by simply pressing together the finger grips 45 and removing the spring hub 44 from the center of the coil. The inside convolution 22 of film is then drawn out from under the roller and the film threaded through the machine in the usual manner.

However, if it is desirable to show a film which is wound on a reel R, the reel may be slid on the shaft 19 and the special take-up core 34 may be slid from shaft 33 by releasing the latch 31 after which a standard film reel may be placed on this shaft. The projector may then be operated in the usual manner but after the film has been projected it must be rewound again on the original film reel carried by the bracket 9 in order to be in the proper position for the next projection.

It should be noticed that the film guiding arm 47 requires no special attention when the non-rewinding system is being used because the hub member 34 is not removed from the lower arm after the film coil has been wound upon it but the coil itself is removed from the hub in the manner above described. During this movement the film coil is moved axially of shaft 30 so that all the pressure upon the film guiding arm 47 is axial of the shaft and tends only to turn arm 47 about its hinge 50 thus increasing the tension on spring 51.

As soon as the coil of film is removed arm 47 springs back to substantially the position shown in Figure 3 except that the arm 47 contacts with the outer edges of the hub members 34 until convolutions of film are wound upon them.

Having thus described my invention, what I claim as new and desire to secure by Letters Patent is:

1. In a motion picture projection apparatus, the combination with a film supporting structure, of a roller adapted to support a roll of film, a support for the roller carried by the apparatus on which said roller may turn freely, and a film reel support arranged axially of the roller and an arm, a pivotal support for the arm on which said arm may move to and from a position between said roller and film reel support.

2. In a motion picture projection apparatus, the combination with a film supporting structure, of a roller, a support for the roller carried by the apparatus on which the roller may turn freely, and a film reel support arranged axially of the roller, an annular grooved member between the roller and reel support, and means engageable with the groove for separating a coil of film supported by the roller from a film reel carried by the shaft.

3. In a motion picture projection apparatus, the combination with a film supporting structure, of a roller, a support for the roller carried by the apparatus on which the latter may turn freely, and a film reel support arranged axially of the roller, an annular grooved member between the roller and reel support, and a hinged arm movable to and from the grooved member.

4. In a motion picture projector, the combination with a film supporting structure, of a flanged roller mounted on the projector and adapted to support a coil of film in a vertical plane, a shaft upon which the flanged roller may turn freely, and a hinged arm adapted to be swung about its pintle into engagement with the flange to hold said coil of film on said roller.

5. In a motion picture projector, the combination with a film supporting structure, of a shaft carried by the projector, a roller adapted to turn on the shaft, a pair of flanges on the roller, one of greater diameter and the other of lesser diameter than the roller, the latter having a groove therein and a hinged arm adapted to swing to and from a position engaging said groove.

OTTO WITTEL.